US009356483B2

(12) United States Patent
Stiesdal (10) Patent No.: US 9,356,483 B2
(45) Date of Patent: May 31, 2016

(54) STATOR SEGMENT UNIT ADAPTED TO BUILD A RING-SHAPED STATOR WHEN ASSEMBLED

(75) Inventor: Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1005 days.

(21) Appl. No.: 13/152,394

(22) Filed: Jun. 3, 2011

(65) Prior Publication Data

US 2011/0304237 A1 Dec. 15, 2011

(30) Foreign Application Priority Data

Jun. 10, 2010 (EP) ..................................... 10165513

(51) Int. Cl.
| | |
|---|---|
| *H02K 15/02* | (2006.01) |
| *H02K 3/12* | (2006.01) |
| *H02K 1/14* | (2006.01) |
| *H02K 15/04* | (2006.01) |

(52) U.S. Cl.
CPC .................. *H02K 3/12* (2013.01); *H02K 1/148* (2013.01); *H02K 15/0435* (2013.01)

(58) Field of Classification Search
USPC ........ 310/195, 202, 254.1, 216.008, 216.009, 310/216.036, 216.037, 216.061, 216.095
See application file for complete search history.

(56) References Cited

U.S. PATENT DOCUMENTS

| | | | | |
|---|---|---|---|---|
| 4,140,935 | A | * | 2/1979 | Braun et al. ................... 310/224 |
| 4,816,710 | A | * | 3/1989 | Silvaggio et al. .............. 310/194 |
| 5,214,336 | A | * | 5/1993 | Schmidt et al. ................ 310/184 |
| 5,343,105 | A | * | 8/1994 | Sakabe et al. ................. 310/179 |
| 5,592,731 | A | | 1/1997 | Huang et al. |
| 5,770,910 | A | * | 6/1998 | Horst ............................. 310/214 |
| 6,265,804 | B1 | * | 7/2001 | Nitta et al. .............. 310/216.066 |
| 6,777,850 | B2 | * | 8/2004 | Harada et al. ............. 310/254.1 |
| 2006/0071114 | A1 | | 4/2006 | Banba et al. |

FOREIGN PATENT DOCUMENTS

| | | |
|---|---|---|
| DE | 202004005652 U1 | 6/2004 |
| EP | 0740403 A1 | 10/1996 |
| EP | 1174982 A2 | 1/2002 |
| GB | 2262842 A | 6/1993 |

* cited by examiner

*Primary Examiner* — Dang Le (57) ABSTRACT

A stator segment unit adapted to build a ring-shaped stator when assembled is provided. The stator segment unit includes a stator yoke with at least one stator tooth protruding from the yoke, at least one stator winding having a first winding section fixed close to the tooth, and a second winding section extending freely from the stator segment unit.

14 Claims, 6 Drawing Sheets

STATOR SEGMENT UNIT ADAPTED TO BUILD A RING-SHAPED STATOR WHEN ASSEMBLED

CROSS REFERENCE TO RELATED APPLICATIONS

This application claims priority of European application No. 10165513 filed Jun. 10, 2010, which is incorporated by reference herein in its entirety.

FIELD OF THE INVENTION

The invention relates to a stator segment unit adapted to build a ring-shaped stator when assembled.

BACKGROUND OF THE INVENTION

Electric machines are able to convert electricity to mechanical power such as an electric motor or reversely mechanical power to electricity such as a generator. Therefore, a rotor and a stator, whereby the rotor rotates relative to the stator by means of magnetic induction represent the essential components of an electric machine.

In terms of eased transportation and handling it is known to segment the rotor and/or the stator in segments of a circle, that is rotor and stator are built of several segmented parts which will be assembled to build a ring-like rotor- and/or stator-assembly.

Regarding the assembling of a stator comprising a stator yoke with several stator tooth forming slots for accommodating the stator windings, it is common to initially assemble the stator segments to build the stator ring and subsequently wind the stator windings around the stator tooth, so that they are located in the slots. Concerning stators with a so called double-layer configuration the windings are disposed in two layers, that is on top of each other, whereby each phase winding occupies a first, that is a bottom position in a stator slot with its outgoing portion and a second, that is a top position in a further stator slot with its returning portion. In other words, each slot accommodates an outgoing phase winding of a first stator winding in a bottom position and a returning phase winding of a further stator winding in a top position.

The assembling of such stators having a double-layer configuration as mentioned is cumbersome, time-consuming and non-effective. After a first phase winding has been installed in the slots of the stator yoke, it occupies a lower portion in a first slot by its outgoing portion and a top position in a second slot by its returning position, that is the bottom position of the second slot is blocked by the returning portion of the first phase winding, thereby inhibiting another outgoing portion of another phase winding to be easily installed in the bottom position of this slot.

However, attempts to solve these problems have been proposed in a segmentation of the phase windings, whereby the stator windings are constructed in two halves, which are installed in the slots of the stator yoke and subsequently connected at their end windings by means of bolts for instance. Yet, this assembly method is still time-consuming and therefore non-effective. Besides, the stator comprises an increased number of separate components.

SUMMARY OF THE INVENTION

Hence, it is an object of the invention to provide an improved stator segment unit capable of being readily connected to build a stator.

This is achieved by a stator segment unit as described above having a stator yoke with at least one stator tooth protruding from the yoke, comprising at least one stator winding having a first winding section fixed closed to the tooth and a second winding section extending freely from the stator segment unit.

According to the invention the stator segment unit comprises one or more already partly installed stator windings, that is a first stator winding having a first winding section fixed closed to the stator tooth or wound around the stator tooth respectively and a second winding section extending freely from the inventive stator segment unit, that is has a free ending. Thereby, the first winding section generally represents an outgoing portion of the stator winding, while the second winding section generally represents a returning portion of the stator winding as the stator winding is wound around the stator tooth protruding from the stator yoke. In other words, the first winding section is located in a lower layer essentially in contact to the stator yoke and the second winding section is located in a higher layer with respect to stators having a double-layer configuration. The inventive stator segment unit usually has the shape of a segment of a circle. Hence, when assembled giving rise to the formation of a ring-shaped stator.

The inventive stator segment units permit a simple assembling of the stator as only the stator yokes of neighbouring stator segment units have to be connected and the second winding sections extending freely from the stator segment unit or stator yoke respectively have to be placed on top of the first winding sections of a further stator winding installed on a neighbouring stator segment unit. Accordingly, the inventive stator segment unit has many advantages particularly regarding assembling, transport and times of service and/or repair.

The inventive stator segment unit is adapted to accommodate multi-phase-winding systems when comprising a respective number of stator tooth protruding from the stator yoke which number essentially complies with the number of phases as this does not influence the basic principle of the invention.

Therefore, it is possible that a stator segment unit comprises two or more stator tooth and two or more stator windings each comprising first and second winding sections, whereby each first winding section of the stator windings is fixed close to respective adjacent stator tooth protruding from the stator yoke and each second winding section extends freely from the stator segment unit. In such a manner multi-phase stator segment units may be realised as mentioned above. According to this embodiment, the basic principle is perpetuated as with reference of a stator having a double-layer configuration the first winding sections of the at least two stator windings occupy the lower layer and the second winding sections of the at least two stator windings extend freely from the stator segment unit in a higher layer.

A stator segment unit may also comprise
- a first group of stator windings and a second group of stator windings, each stator winding comprising first and second winding sections,
- a first group of stator tooth comprising a number of adjacent stator tooth and a second group of stator tooth comprising a number of adjacent stator tooth, each stator tooth protruding from the stator yoke, whereby the stator tooth of the second group are adjacently disposed to the stator tooth of the first group, whereby
- the first winding sections of the first group of stator windings are fixed close to respective adjacent stator tooth of the first group of stator tooth and the first winding sections of the second group of stator windings are fixed close to respective adjacent stator tooth of the second group of stator tooth and the second winding sections of the first group of stator windings are disposed above respective first windings of the second group of stator windings and the second winding sections of the second group of stator windings extend freely from the stator segment unit.

This embodiment is slightly different to the one given before even though the basic idea is still the same. With respect to a double-layer configuration of a stator and accordingly of the stator segment units, a stator segment unit has regions of partly installed stator windings along the length of the stator yoke, whereby the first winding sections of the first group of stator windings are fixed close to respective adjacent stator tooth of the first group of stator tooth. Adjacently located are regions of fully installed stator windings, whereby the first winding sections of the second group of stator windings are fixed close to respective adjacent stator tooth of the second group of stator tooth and the second winding sections of the first group of stator windings are disposed above respective first windings of the second group of stator windings. At last, a stator segment unit comprises a region with the second winding sections of the second group of stator windings extending freely from the stator segment unit. In other words, the stator segment unit still has one region adapted to accommodate second or returning winding sections and one region for being attached on top of first winding sections of a further stator segment unit. The number of stator windings and accordingly stator tooth belonging to one group is not restricted.

A stator segment unit may advantageously comprise at least one connecting member for connecting the stator segment unit with further stator segment units. Hence, a number of stator segment units may be attached in up- and/or downstream thereby forming a stator in step-wise manner.

The connecting portion of a first stator segment unit may provide a plug-connection with a connecting portion of a further segment stator segment unit. Plug-connections give rise to fast and easy connecting of stator segment units. The plug-connection may be detachable or non-detachable.

The connecting portion is favourably either a groove-like recess or a tongue-like protrusion and disposed at the free opposite ends of the stator segment unit with respect to the circumferential direction of the stator. It is also possible that the connecting portion is a step-like rebate and/or a step-like recess. Advantageously, a stator segment unit comprises both groove- or step-like recess at one end and tongue-like protrusion or step-like rebate disposed at the opposing end.

Alternatively or additionally, the connecting portion of a first stator segment unit may provide a snap-fit connection with a connecting portion of a further stator segment unit. Snap-fit connections are known and represent a mechanical joint-system where part-to-part attachment is accomplished with locating and locking features corresponding with one or the other of the components being joined. Joining requires the (flexible) locking features to move the side for engagement with a corresponding mating part, followed by return of the locking feature toward its original position. Located features are inflexible, providing strength and stability in the attachment.

Consequently, in this embodiment the connecting portion may either be a snap-fit or the like or a recess or the like adapted to receive a snap-fit. All shapes of snap-fits and corresponding recesses are possible. Of course, the snap-fits may be inclined, thereby facilitating connecting the stator segment units. The snap-fit connection may be detachable or non-detachable. The connecting portion, i.e. the snap-fit and the corresponding recess may be provided at the endings of the stator segment units, that is in circumferential positions in respect to a ring-shaped stator.

In a further embodiment of the invention the stator tooth may comprise a first stator tooth segment protruding from the stator yoke and at least one further stator tooth segment adapted to be fixed to the first stator tooth segment so as to build the stator tooth. Thereby, preferably the first stator tooth segment has the same height as the first winding section. In such a manner, the first winding sections are stably disposed in close contact to the first stator tooth segment(s). Segmentation of the stator tooth has advantages in terms of the assembling of the stator as the connection of the stator segment units is eased.

Preferably, the stator tooth segments are detachably attached to each other using a connection means. In favour, the connection means is a threaded bolt. The connection means gives rise to a stable and stiff connection of the stator tooth segments. If need be, bores or the like are provided within the stator tooth segments for accommodating the connecting means.

Aside, the invention relates to an electric machine having at least one phase comprising a rotor and a segmented stator, wherein the stator is built from a number of stator segment units as described before. The electric machine may either be an electric motor or a generator. The electric machine may comprise an arbitrary number of phases.

Furthermore, the invention relates to a method for assembling a stator of an electric machine as mentioned before, wherein a stator is assembled by connecting a number of stator segment units as described before, comprising: connecting a first stator segment unit to a further adjacently disposed stator segment unit using a connecting means as a first step, placing the second winding sections extending freely from the stator windings of the first stator segment unit on top of the first winding sections of the stator windings of the further stator segment unit as a second step and repeating the preceding steps one and two until a complete stator has been built.

In contrast to the known methods for assembling a stator essentially comprising firstly assembling the stator segments to build a ring-shaped stator and subsequent cumbersome and time-consuming installation of the stator windings in the slots between the stator tooth the inventive method is eased as the inventive stator segment units comprise at least one stator winding having a first winding section fixed close to the tooth and a second winding section extending freely from the stator segment unit, that is represent partly installed stator windings.

According to the invention, a fully installed stator, that is having installed stator windings is progressively assembled as in the first step a first stator segment unit is connected to a further stator segment unit being adjacently disposed. A connecting means, which may be a mechanical joint as a screw, bolt or the like or a connecting portion provided with the stator yoke as mentioned before is incorporated to accomplish a stable connection of the stator segment units. In the following second step the second winding sections extending freely from the first stator segment unit of the stator windings of the first stator segment unit are placed on top of the first winding sections of the stator windings of the further stator segment unit. As a result, two stator segment units are firmly connected having fully installed stator windings. The steps are repeated until the ring-shaped stator has been completely assembled.

If a stator segment unit comprises a first stator tooth segment protruding from the stator yoke and at least one further stator tooth segment adapted to be fixed to the first stator tooth segment so as to build the stator tooth, it is preferred, when after placing the second winding sections extending freely from the stator windings of the first stator segment unit on top of the first winding sections of the stator windings of the further stator segment unit, the at least one further stator tooth segment is fixed to the first stator tooth segment using a connection means. In other words, the at least one further stator tooth segment is inserted between the installed second winding sections of the stator windings of the first stator segment unit and is firmly fixed to the stator tooth segment protruding from the stator yoke of the further stator segment unit.

Thereby, it is preferred that threaded bolts extending from the stator yoke to the stator tooth segments are used as connection means. In such a manner the threaded bolts penetrate from the stator yoke of the stator segment unit and further through the stator tooth segments so as to build a firm connection between the stator yoke, the stator tooth segment protruding from the stator yoke and the stator tooth segment adapted to be fixed to the stator tooth segment protruding from the stator yoke. Thereby, stator yoke and stator tooth segment protruding from the yoke may comprise bores, while the stator tooth segment adapted to be fixed to the stator tooth segment protruding from the yoke may comprise a stud hole.

BRIEF DESCRIPTION OF THE DRAWINGS

In the following the invention is described in detail as reference is made to the figures, whereby.

DETAILED DESCRIPTION OF THE INVENTION

Figure 1:
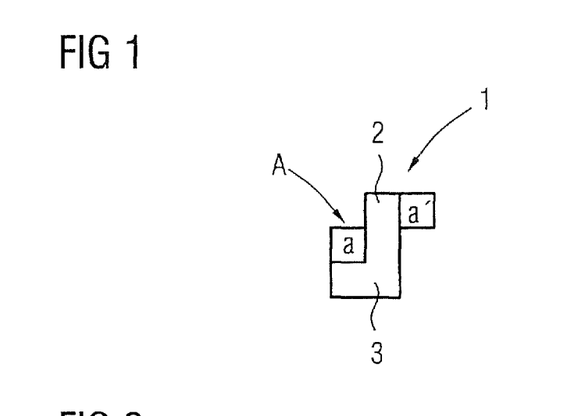
FIG. 1 shows a principle view of an inventive stator segment unit according to a first embodiment of the invention.

FIG. 1 shows a stator segment unit 1 adapted to build a ring-shaped stator in a first or basic embodiment of the invention. The stator segment unit 1 comprises one stator tooth 2 protruding from a stator yoke 3. The stator winding A is wound around the stator tooth 2, whereby a first winding section a of the stator winding A representing an outgoing side of the stator winding A is fixed close to the stator tooth 2 and a second winding section a' representing a returning side of the stator winding A extends freely from the stator segment unit 1. Hence, this stator segment unit 1 depicts a one phase configuration. It must be mentioned that all stator segment units are curved, that is represent segments of a circle so as to build a ring-shaped stator when assembled, even though they are drawn straight.

Figure 2:
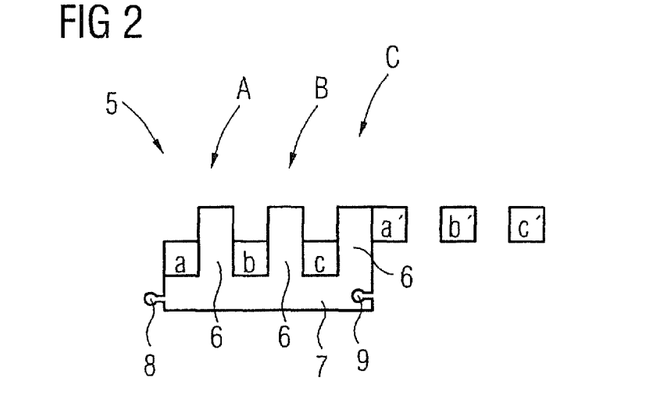
FIG. 2 shows a principle view of an inventive stator segment unit according to a second embodiment of the invention.

FIG. 2 shows a stator segment unit 5 according to a second embodiment of the invention. The stator segment unit 5 comprises three stator tooth 6 protruding from a stator yoke 7. The stator segment unit 5 represents a three phase configuration having three stator windings A, B, C each having a different phase. Each stator winding A, B, C has a first winding section a, b, c representing an outgoing side of the respective stator winding A, B, C each fixed close to respective adjacent stator tooth 6 and a second winding section a', b', c' representing a returning side of the respective stator winding A, B, C each extending freely from the stator segment unit 5.

Figure 12:
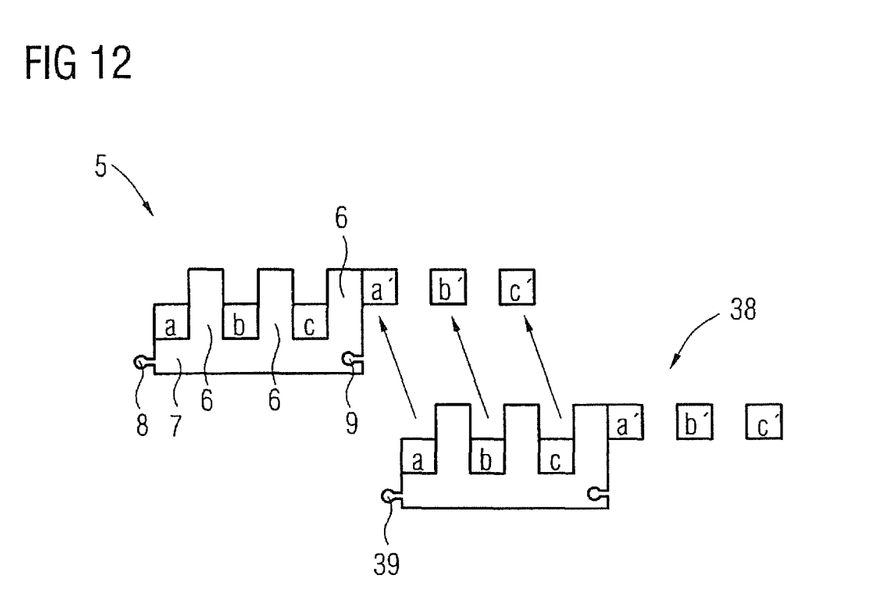
FIG. 12, 13 show the essential steps of the inventive method according to a fourth embodiment of the invention.
Figure 13:
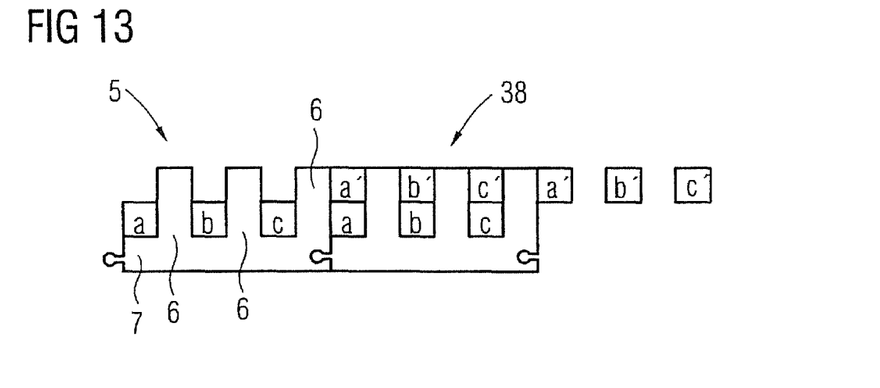

Further, the stator segment unit 5 comprises a connecting portion in the shape of a snap-fit 8 and a recess 9 adapted to receive the snap-fit 8 disposed at opposite endings of the stator segment unit 5 for connecting the stator segment unit 5 to at least one further stator segment unit (cf. FIG. 12, 13). Thus, connecting a number of stator segment units 5 represents a snap-fit connection. The snap-fit 8 may be integrally formed with the stator yoke 7 or be finely attached to the stator yoke 7 as a separate member using appropriate connecting means.

Figure 3:
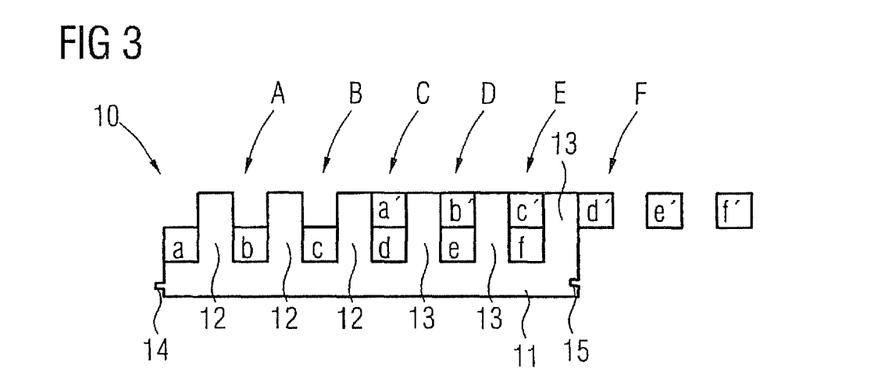
FIG. 3 shows a principle view of an inventive stator segment unit according to a third embodiment of the invention.

FIG. 3 shows a stator segment unit 10 according to a third embodiment of the invention. The stator segment unit 10 comprises six stator tooth protruding from the stator yoke 11 subdivided in a first group of stator tooth comprising the stator tooth 12 and a second group of stator tooth comprising the stator tooth 13. As is discernible, the first group of stator tooth and the second group of stator tooth are adjacently disposed. A first group of stator windings comprising the stator windings A, B, C has its first winding sections a, b, c fixed close to respective stator tooth 12 of the first group of stator tooth and a second group of stator windings comprising the stator windings D, E, F has its first winding sections d, e, f fixed close to respective stator tooth 13 of the second group of stator tooth. The second winding sections a', b', c' of the first group of stator windings A, B, C are disposed on top of respective first winding sections d, e, f of the second group of stator windings D, E, F, whereas the second winding sections d', e', f' of the second group of stator windings extend freely from the stator segment unit 10.

Figure 5:
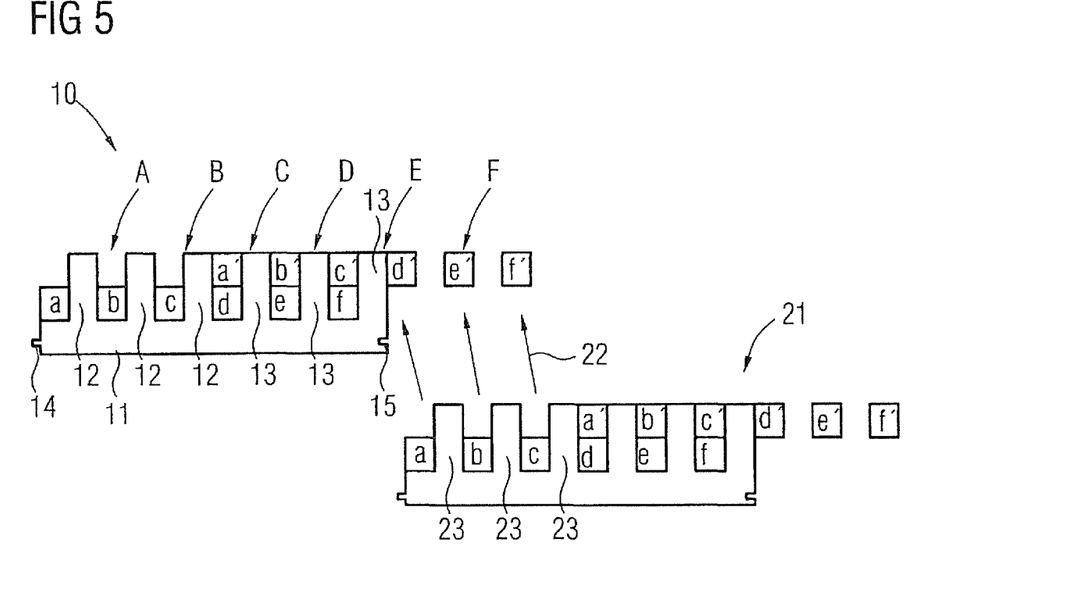
FIG. 5 shows a principle view of an inventive stator segment unit according to a fifth embodiment of the invention.
Figure 6:
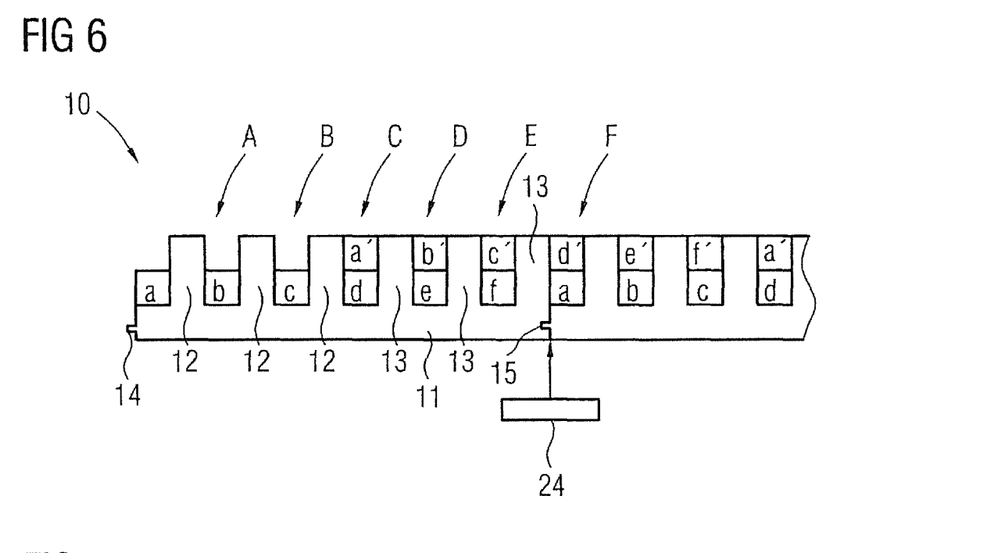
FIG. 6 shows the essential steps of the inventive method according to a first embodiment of the invention.

Further, the stator segment unit 10 comprises a connecting portion in the shape of a tongue 14 and a groove 15 disposed at opposite endings of the stator yoke 11 for connecting the stator segment unit 10 to at least one further stator segment unit (cf. FIG. 5, 6). The tongue 14 may be integrally formed with the stator yoke 11.

Figure 4:
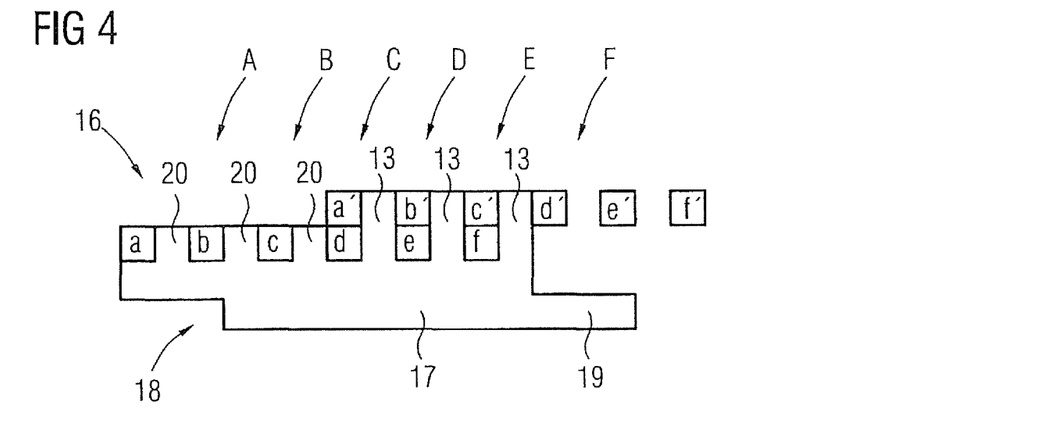
FIG. 4 shows a principle view of an inventive stator segment unit according to a fourth embodiment of the invention.

FIG. 4 shows a stator segment unit 16 akin to the embodiment depicted in FIG. 3 as it has the same phase configuration as the stator segment unit 10, same reference numbering concerning stator windings, stator winding sections and stator tooth 13 of the second group of stator tooth are used. It is discernible, that the stator segment unit 16 differs from the stator segment unit 10 in the connecting portion, which is integrally built with the stator yoke 17 in the shape of a step-like recess 18 and a rebate 19. Further, the first group of stator tooth has segmented stator tooth with stator tooth segments 20 protruding from the stator yoke 17 having a reduced height, in particular half of the height, so that further stator tooth segments (not shown) may be fixed to the stator tooth segments 20 protruding from the stator yoke 17, so as to build a complete stator tooth.

FIGS. 5 and 6 depict the essential steps of the inventive method for assembling a ring-shaped stator from a number of stator segment units. The stator segment units are essentially the ones known from the embodiment according to FIG. 3. Hence, the same reference numbers may be used at least for the first stator segment unit 10. Additionally, only relevant parts are numbered in order to keep the principle drawing clear. In a first step, according to FIG. 5 the first stator segment unit 10 is connected to a further stator segment unit 21 as denoted by the arrows 22. Subsequently, the second winding sections d', e', f' of the second group of stator windings comprising the stator windings D, E, F of the stator segment unit 10 are placed on top of respective first winding section a, b, c of the first group of stator windings A, B, C of the stator segment unit 21 being fixed to the first group of stator tooth comprising the three stator tooth 23 (cf. FIG. 6). As can be seen in FIG. 6, a connecting means 24 in the exemplary form of a base plate overlapping both stator segment units 10 and 21 is used to firmly connect the stator segment unit 10 with the stator segment unit 21. In the following, the described steps are repeated until a complete ring-shaped stator has been built.

Figure 7:
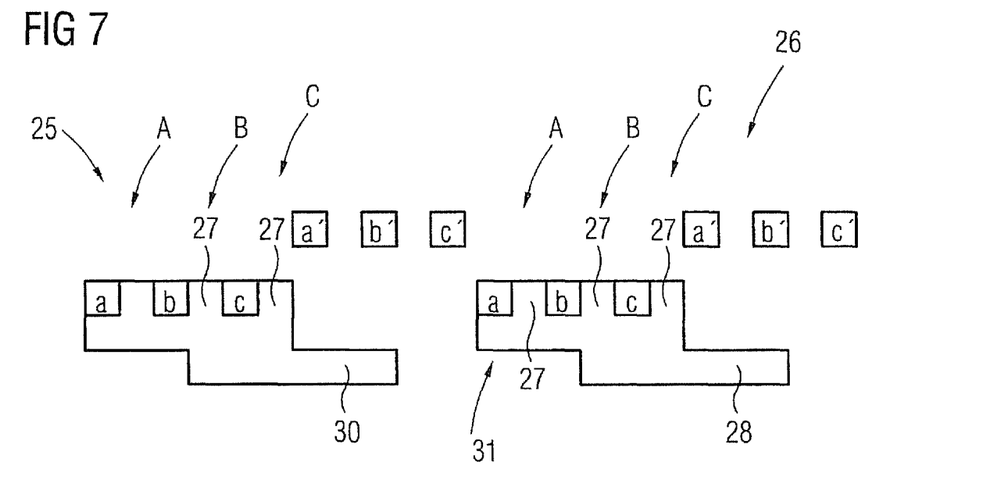
FIG. 7, 8 show the essential steps of the inventive method according to a second embodiment of the invention.
Figure 8:
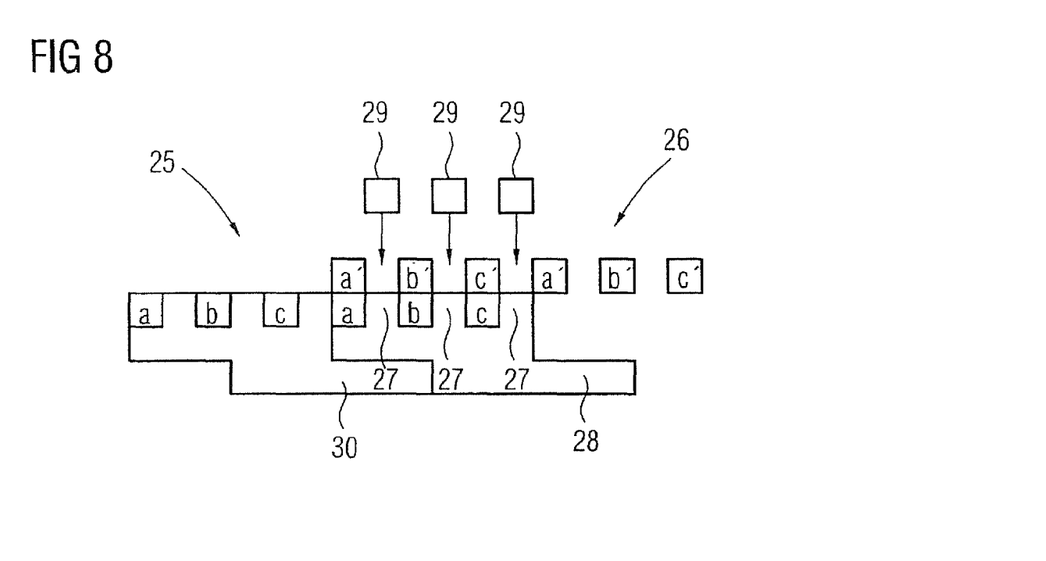

FIGS. 7 and 8 depict the inventive method using different stator segment units 25, 26 having segmented stator tooth, that is with reference to the stator segment unit 26 three stator tooth segments 27 protruding from the stator yoke 28 and a second stator tooth segment 29 adapted to be fixed to the first stator tooth segment 27 protruding from the stator yoke 28 (cf. FIG. 8). Again, in a first step the stator segment units 25, 26 are connected to each other. In this embodiment a rebate 30 of the stator segment unit 25 engages with a recess 31 of the stator segment unit 26 by sliding the stator segment unit 26 towards the stator segment unit 25 or vice versa. As can be seen from FIG. 8 the second winding sections a', b', c' of the stator windings A, B, C of the stator segment unit 25 are placed on top of respective first winding sections a, b, c of the stator windings A, B, C of the stator segment unit 26. Subsequently, the second stator tooth segments 29 are placed on top of the stator tooth segments 27 protruding from the stator yoke 28. Appropriate connecting means such as screws, bolts, adhesives or the like may be used in order to establish a stable connection between the stator tooth segments 27 and the stator tooth segments 29. The described steps are accordingly repeated until a ring-shaped stator has been built.

Figure 9:
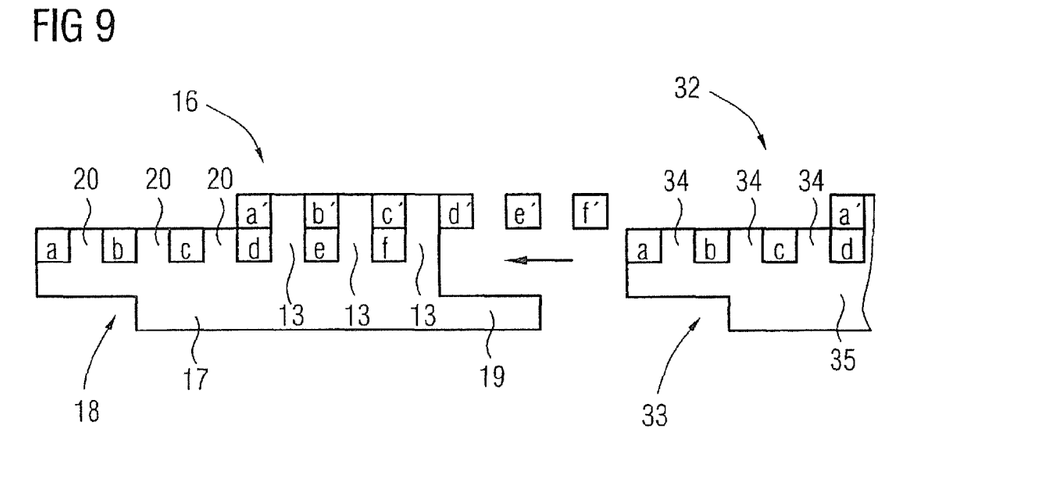
FIG. 9-11 show the essential steps of the inventive method according to a third embodiment of the invention.
Figure 10:
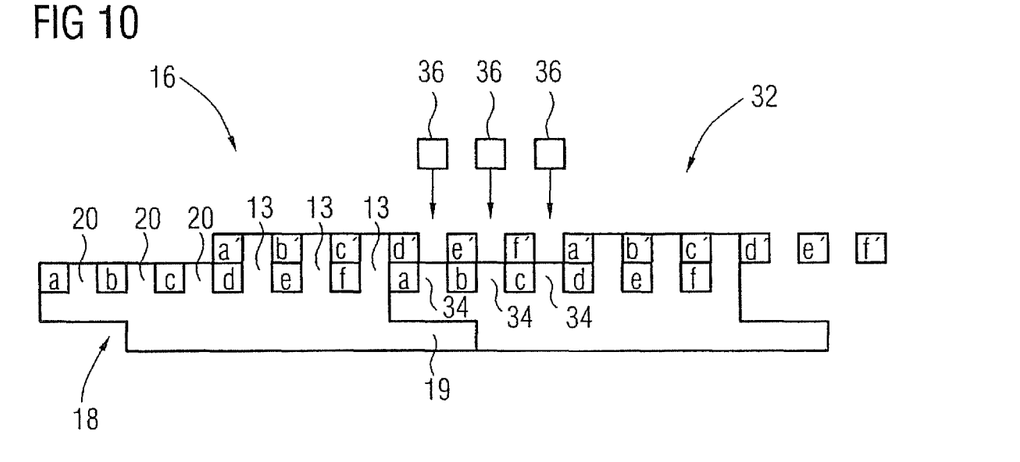
Figure 11:
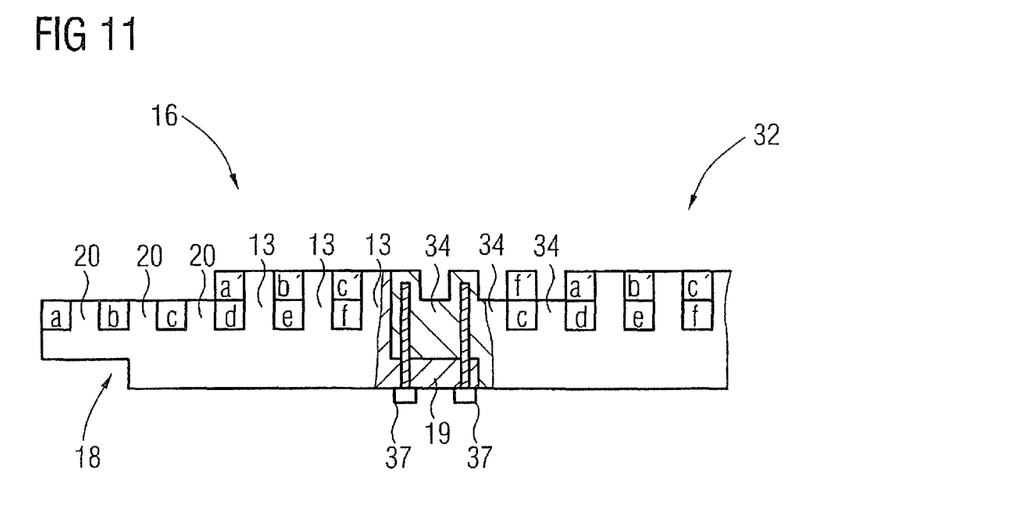

FIGS. 9-11 represent another embodiment of the inventive method, which essentially differs from the embodiments mentioned before in the design of the stator segment units. Here, the stator segment units are akin to the ones described in FIG. 4. Hence, the left stator segment unit is the one known from FIG. 4 having the same reference numbers. Again, only essential parts are numbered.

In a first step, the stator segment unit 32 is slid towards the stator segment unit 16, whereby the recess 33 engages with the rebate 19. As can be seen from FIG. 10, the second winding sections d', e', f' of the second group of stator windings D, E, F of the stator segment unit 16 are placed on top of the first winding sections a, b, c of the first group of stator windings A, B, C of the stator segment unit 32. Further, each stator tooth of the first group of stator tooth of the stator segment unit 32 comprises a stator tooth segment 34 protruding from the stator yoke 35 (with respect to stator segment unit 32), whereby a second stator tooth segment 36 is placed on the respective stator tooth segments 34 after installation of the second winding sections d', e', f' of the stator segment unit 16 on top of the first winding sections a, b, c of the stator segment unit 32 respectively. In a subsequent step depicted in FIG. 11 threaded bolts 37 are used to firmly connect the stator segment units 16, 32 to each other whereby the threaded bolts 37 penetrate through the stator segments 16, 32 the stator tooth segments 34 and the stator tooth segments 36. Hence, the threaded bolts 37 hold the separate tooth parts 34, 36 and additionally the stator segment units 16, 32 together.

FIG. 12, 13 show the essential steps of the inventive method according to another embodiment of the invention. The stator segment unit shown on the left is essentially the same as depicted in FIG. 2. Hence, the same reference numbers are valid. In a first step the stator segment unit 38 is connected to the stator segment unit 5 by means of the respective connecting portions, that is the snap-fit 39 provided with the stator segment unit 38 engages the recess 9 of the stator segment unit 5. In the following, the second winding sections a', b', c' of the stator windings A, B, C of the stator segment unit 5 are placed on top of the first winding sections a, b, c of the stator windings A, B, C of the stator segment unit 38. Thus, the stator segment units 5, 38 are connected by means of a snap-fit connection with readily installed stator windings A, B, C. The preceding steps are repeated until a ring-shaped stator has been built.

The invention claimed is:

1. A ring-shaped stator having a double-layer configuration comprising:
   a first stator segment unit and a second neighbouring stator segment unit connected to the first stator segment unit, each stator segment unit comprising:
      a stator yoke comprising stator teeth protruding from the stator yoke; and
      a stator winding comprising a plurality of first winding sections wound around the teeth and a plurality of second winding sections extending freely from each stator segment unit;
   wherein stator teeth of one of the first segment unit and the second segment unit define first stator tooth segments;
   wherein the stator further comprises discrete second stator tooth segments arranged over at least a portion of the first stator tooth segments;
   wherein the stator further comprises a plurality of bolts extending through at least a portion of the first stator segment unit, the second stator segment unit, the first stator tooth segments, and the second stator tooth segments such that the bolts hold the first and second stator tooth segments together, and the first and second stator segment units together, and
   wherein each of the plurality of second stator winding sections extending freely from the first stator segment unit fully overlaps a respective first stator winding section of the second neighbouring stator segment unit.

2. The stator as claimed in claim 1, wherein a connecting portion for connecting the first stator segment unit with the second neighbouring stator segment unit is further provided on the stator yoke of at least one of the first stator segment or the second neighbouring stator segment.

3. The stator as claimed in claim 2, wherein the connecting portion comprises a plug connection.

4. The stator as claimed in claim 2, wherein the connecting portion comprises a groove-like recess or a tongue-like protrusion.

5. The stator as claimed in claim 2, wherein the connecting portion comprises a step-like rebate and/or a step-like recess.

6. The stator as claimed in claim 2, wherein the connecting portion comprises a snap-fit connection.

7. The stator as claimed in claim 6, wherein the connecting portion comprises a recess adapted to receive the snap-fit.

8. The stator as claimed in claim 1, wherein at least one of the stator teeth comprises a first stator tooth segment protruding from the stator yoke and a second stator tooth segment attached to the first stator tooth segment.

9. The stator as claimed in claim 8, wherein the first and the second stator tooth segments are detachably attached to each other by a threaded bolt.

10. The stator according to claim 1, wherein the first stator segment unit and the second stator segment unit are in interlocking relationship with one another.

11. The stator according to claim 1, wherein each stator segment unit comprises:
a stator winding comprising a first winding section wound around at least one of the teeth and a second winding section extending freely from each stator segment unit, wherein the second stator winding section extending freely from the first or second segment unit is arranged in overlapping relationship over a respective first stator winding section of the same stator segment unit.

12. The stator according to claim 1, wherein each stator segment unit comprises:
a stator winding comprising a first winding section wound around at least one of the teeth and a second winding section extending freely from each stator segment unit;
wherein the second stator winding section extending freely from the first or second segment unit is arranged in overlapping relationship over a respective first stator winding section of the same stator segment unit.

13. An electric machine, comprising:
a rotor; and
a segmented stator about which the rotor revolves comprising:
a first stator segment unit and a second neighbouring stator segment unit connected to the first stator segment unit, each stator segment unit comprising:
a stator yoke comprising stator teeth protruding from the stator yoke; and
a stator winding comprising a plurality of first winding sections fixed wound around the teeth and a plurality of second winding sections extending freely from the stator segment unit;
wherein stator teeth of one of the first segment unit and the second segment unit define first stator tooth segments;
wherein the stator further comprises discrete second stator tooth segments arranged over at least a portion of the first stator tooth segments;
wherein the stator further comprises a plurality of bolts extending through at least a portion of the first stator segment unit, the second stator segment unit, the first stator tooth segments, and the second stator tooth segments such that the bolts hold the first and second stator tooth segments together, and the first and second stator segment units together; and
wherein the plurality of second stator winding sections extending freely from the first stator segment unit fully overlaps a respective first stator winding section of the second neighbouring stator segment unit.

14. The electric machine according to claim 13, wherein the first stator segment unit and the second stator segment unit are in interlocking relationship with one another.

* * * * *